United States Patent
Rendon

(10) Patent No.: US 10,954,354 B1
(45) Date of Patent: Mar. 23, 2021

(54) UPCYCLING PROCESS FOR UNSORTED WASTE STREAM

(71) Applicant: Timeplast, LLC, Coral Gables, FL (US)

(72) Inventor: Manuel Rendon, Coral Gables, FL (US)

( * ) Notice: Subject to any disclaimer, the term of this patent is extended or adjusted under 35 U.S.C. 154(b) by 0 days.

(21) Appl. No.: 17/072,970

(22) Filed: Oct. 16, 2020

(51) Int. Cl.
| | |
|---|---|
| *C08J 11/08* | (2006.01) |
| *B29B 17/02* | (2006.01) |
| *B29B 17/00* | (2006.01) |

(52) U.S. Cl.
CPC ............... *C08J 11/08* (2013.01); *B29B 17/02* (2013.01); *B29B 2017/001* (2013.01); *B29B 2017/0244* (2013.01); *C08J 2323/06* (2013.01); *C08J 2323/12* (2013.01); *C08J 2325/06* (2013.01); *C08J 2327/06* (2013.01)

(58) Field of Classification Search
USPC ................................... 521/47, 46.5; 264/211
See application file for complete search history.

(56) References Cited

U.S. PATENT DOCUMENTS

| | | |
|---|---|---|
| 5,198,471 A | 3/1993 | Nauman |
| 2003/0146547 A1 | 8/2003 | Fischer |

*Primary Examiner* — Terressa Boykin
(74) *Attorney, Agent, or Firm* — Sanchelima & Associates, P.A.; Christian Sanchelima; Jesus Sanchelima

(57) ABSTRACT

A dynamic process for upcycling polymers. Polymers from a diverse post-consumer waste stream are gathered in a mixture. The mixture is extruded and combined with a liquid additive containing a particular PE wax at the verge of polymerization. The liquid additive is repolymerized into LDPE to form pellets. The pellets are delivered into a reactor and submerged in a suitable solvent to dissolve the LDPE. Causing a gradual and orderly separation of the remaining polymers from one another, resulting in a layered substrate. The suitable solvent, enzymes or depolymerizing compatible chemical is delivered into the reactor through independent pipes attached to tanks containing the suitable depolymerizing agent. The process repeats depolymerizing the layered substrate layer by layer with additional suitable solvents/enzymes or depolymerizing agents for each of the polymers resulting in the dissolving of the remaining polymers in an orderly manner producing a layered wax-like material for upcycling.

14 Claims, 1 Drawing Sheet

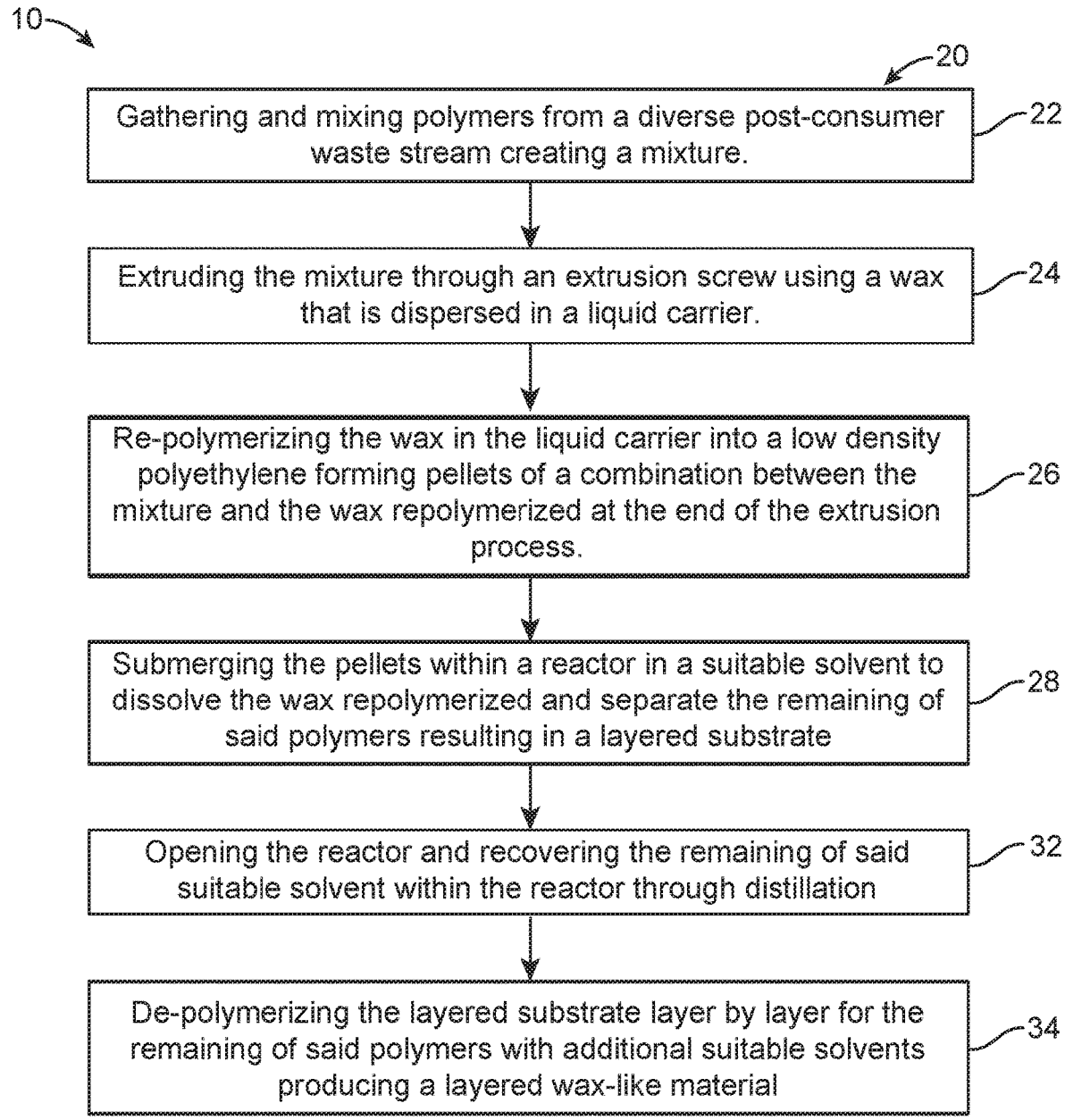

UPCYCLING PROCESS FOR UNSORTED WASTE STREAM

BACKGROUND OF THE INVENTION

1. Field of the Invention

The present invention relates to an upcycling process, more particularly, to an upcycling process for plastics that can be applied to post-consumer plastic products without the need to sort the post-consumer plastic products by plastic type beforehand.

2. Description of the Related Art

Several designs for upcycling processes have been designed in the past. None of them, however, include a process that allows for a dynamic upcycling of plastics without sorting of the plastics by type through dissolution and depolymerization.

Applicant believes that a related reference corresponds to U.S. patent publication No. 2003/0146547 for a method for recovering mixed plastic matter. Applicant believes that another related reference refers to U.S. Pat. No. 5,198,471 for polymer recycling by selective dissolution. None of these references, however, teach of a process for plastic upcycling done through dynamic depolymerization which eliminates the need to sort the various and diverse plastics by type.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide a process that can be used for the dynamic upcycling of plastic from post-consumer plastic products.

It is another object of this invention to provide a process that can applied to unsorted post-consumer plastic products.

It is still another object of the present invention to provide a process that helps to reduce plastic waste and pollution.

It is also another object of the present invention to provide a process for upcycling plastic through depolymerization.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which:

FIG. 1 represents a flowchart of the process 20 for upcycling products.

DETAILED DESCRIPTION OF THE EMBODIMENTS OF THE INVENTION

Referring now to the drawings, where the present invention is generally referred to with numeral 10, it can be observed that it basically includes an upcycled plastic 10 achieved through a process 20.

Upcycling of polymers allows for the polymers to be reused and repurposed in a manner that helps to reduce additional waste as is achieved with process 20. Process 20 includes a first step 22 involving gathering and mixing of various plastics or polymers from a diverse post-consumer waste stream to create a mixture. The plastics contained within the waste stream being, but not limited to: low-density polyethylene (LDPE), high-density polyethylene (HDPE), polyethylene terephthalate (PET), polypropylene (PP), polystyrene (PS) and polyvinyl chloride (PVC). It may be suitable to shred the mixture from first step 22.

Process 20 includes a second step 24 involving processing and extruding of the mixture of various types of plastics from first step 22 through an extrusion screw. Second step 24 will combine the mixture with a liquid additive containing a particular polyethylene wax in canola oil as a chemical carrier. It is to be understood that the polyethylene wax is to be at the verge of polymerization. Thereby meaning that the polyethylene wax is manufactured by dissolving LDPE into a heptane bath in a particular manner. The heptane bath is to be maintained at a temperature between 155° and 255° Celsius with the LDPE being submerged within the heptane bath for a period of time between 15 and 45 minutes.

The polyethylene wax may have a high molecular weight causing the polyethylene wax to become LDPE once again when the polyethylene wax is re-polymerized through the extrusion heat after being added as a liquid additive to the mixture. Process 20 includes a third step 26 involving repolymerizing of the polyethylene wax from second step 24 into LDPE or re-polymerized LDPE. During third step 26, pellets from the mixture may form at the end of the extrusion process. Importantly, the pellets may contain a non-homogeneous mix of various plastics along with the re-polymerized LDPE from third step 26.

Process 20 further includes a fourth step 28 involving introducing the pellets from third step 26 into a reactor. Within the reactor depolymerization will occur. Fourth step 28 further includes submerging the pellets within the reactor in heptane or another suitable solvent for the re-polymerized polyethylene wax into LDPE. The heptane is to be maintained at a temperature between 155° and 255° Celsius. The pellets are to be submerged in the heptane for an hour. It is to be understood that the heptane will be delivered into the reactor through a pipe, otherwise referred to as first arm, from a tank containing a plethora of heptane or a suitable solvent for LDPE and HDPE. The submerging of the pellets within heptane will cause all LDPE and HDPE to dissolve. Importantly, the LDPE's solvation from second step 24, which may be aided by agitation, will cause all of the polymers or plastics that were not dissolved by the heptane such as PET, PP, PVC, and PS to gradually separate from one another since they were all bonded by the same element, that being repolymerized polyethylene wax. The separation occurs as the LDPE was previously serving as a molecular entanglement factor between the polymers of the non-homogeneous mixture. The remaining polymers will be separated based on their specific densities and their buoyancy in the solvent bath, the solvent bath's specific density will be dynamically calculated and altered using different suitable solvents with different specific densities, with the goal of having certain plastics sinking while others floating to further push the polymer layered arrangement per type. Thereby resulting in a layered substrate with defined compositions that may allow for the subsequent solvation process to be possible within one same reactor, and the chemical sorting of the mixture.

The layered substrate will be in the exampling following order: PP on top, PS underneath of PP, PVC underneath of PS and PET at the bottom underneath of PVC. The density of PP estimated between 0.895 g/cm$^3$ and 0.923 g/cm$^3$. The density of PS estimated at 1.051 g/cm$^3$. The density of PVC estimated at 1.379 g/cm$^3$. The density of PET estimated at 1.382 g/cm$^3$.

Process 20 may include a fifth step 32 involving opening of the reactor's connection to the first arm and recovering the remaining heptane in the reactor with the first arm through distillation. Allowing for the reactor and the layered substrate to be ready to undergo a subsequent depolymerization once again for the remaining layers of polymers. This means that the process will allow for the remaining polymers to dissolve in an orderly manner.

Process 20 will continue to be applied to the layered substrate. It is to be understood that fourth step 28 and fifth step 32 may be repeated with different solvents to be compatible with each subsequent polymer that is to be dissolved. Process 20 includes a sixth step 34 involving repeating fourth step 28 and fifth step 32. The layered substrate may have a top layer of PP, which is to be treated. The first arm will close, and then a second arm attached to the reactor will open, the second arm may be connected to a second tank containing a second solvent compatible with PP, such as Phthalic anhydride. The layered substrate will be submerged in the second solvent for an hour at a temperate between 155° and 255° Celsius until the PP has dissolved, then turned into a wax-like material through cooling and precipitation Immediately after, the reactor will be opened, and a volatilization temperature will be applied to the reactor to extract the second solvent by phasing it out and recovering it via the second arm through distillation. Thereby resulting in the layered substrate ready to be acted on by a third arm and a third solvent to dissolve an additional layer of polymer.

It is to be understood that process 20 and more specifically, sixth step 34 may be repeated until every layer of polymer in the layered substrate has been treated. With each layer being treated with a different solvent to dissolve the polymer of the layer next in line. Each solvent will be delivered with a different arm attached to a different tank containing the necessary solvent or solvents.

At the conclusion of process 20, a layered wax-like material will result. The layered wax-like material may be used as raw material for manufacturing new plastic goods, or as a raw material for other industries such as the lubricant industry. Alternatively, and as the worst-case scenario, the layered wax-like material can be deposited into a landfill. This may have better outcome than with untreated plastic, as the layered wax-like material may have a much more compacted volume, a better dispersing particle size and a lowered molecular weight resulting in a more benign chemical structure to the surrounding environment.

It is to be understood that any other polymers from post-consumer products may be combined and treated with any other appropriate solvent or solvents, heat-resistant enzymes or any depolymerizing compatible chemical, not just the aforementioned polymers or solvents. Process 20 may be repeated as necessary depending on the number of layers in the layered substrate.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A process for upcycling polymers, comprising:
   a) gathering and mixing polymers from a diverse post-consumer waste stream creating a mixture;
   b) extruding the mixture through an extrusion screw using a wax that is dispersed in a liquid carrier;
   c) re-polymerizing the wax in the liquid carrier into a low density polyethylene forming pellets of a combination between the mixture and the wax repolymerized at the end of the extrusion process;
   d) submerging the pellets within a reactor in a suitable solvent to dissolve the wax repolymerized and separate the remaining of said polymers resulting in a layered substrate;
   e) opening the reactor and recovering the remaining of said suitable solvent within the reactor through distillation; and
   f) de-polymerizing the layered substrate layer by layer for the remaining of said polymers with additional suitable solvents producing a layered wax-like material.

2. The process of claim 1 wherein said wax has a molecular weight of at least 50% of the molecular weight of the low density polyethylene.

3. The process of claim 1, wherein said polymers are at least one of low-density polyethylene (LDPE), high-density polyethylene (HDPE), polyethylene terephthalate (PET), polypropylene (PP), polystyrene (PS) or polyvinyl chloride (PVC).

4. The process of claim 1 wherein said mixture is shredded.

5. The process of claim 1, wherein said liquid additive contains polyethylene wax in biobased oil as a carrier.

6. The process of claim 5, wherein said polyethylene wax is manufactured by dissolving a polymer in an initial solvent.

7. The process of claim 6, wherein said polymer is LDPE and said initial solvent is heptane.

8. The process of claim 6, wherein said polymer is submerged in the initial solvent for a period of time between 15-45 minutes, said initial solvent maintained at a temperature between 155° and 255° Celsius.

9. The process of claim 1, wherein the pellets remain submerged within the suitable solvent for 1 hour per cycle, one of said polymers is treated per cycle, the suitable solvent is maintained at a temperature between 155° and 255° Celsius.

10. The process of claim 1 wherein a combination for the suitable solvent is selected based on solvent density and the role of the solvent density in the density separation of the polymers being dissolved.

11. The process of claim 1 wherein said polymers being treated need to sink within the suitable solvent and the remaining of said polymers not being treated need to float in the suitable solvent.

12. The process of claim 1, wherein the remaining of said polymers are separated by density.

13. The process of claim 1 wherein organic material, metal, and glass are found in the waste stream and will also be separated by density.

14. The process of claim 1, wherein said wax-like material serves as raw material for manufacturing new goods.

* * * * *